(12) United States Patent
Pai et al.

(10) Patent No.: US 8,133,470 B2
(45) Date of Patent: Mar. 13, 2012

(54) MICROPOROUS CRYSTALLINE SILICOALUMINO/(METALLO) ALUMINOPHOSPHATE MOLECULAR SIEVE AND METHOD OF SYNTHESIS THEREOF

(75) Inventors: Shivanand Pai, Greater Noida (IN); Bharat Lakshman Newalkar, Greater Noida (IN); Nettem Venkateswarlu Choudary, Greater Noida (IN)

(73) Assignee: Bharat Petroleum Corporation Limited, Mumbai (IN)

( * ) Notice: Subject to any disclaimer, the term of this patent is extended or adjusted under 35 U.S.C. 154(b) by 396 days.

(21) Appl. No.: 12/307,213

(22) PCT Filed: Jul. 20, 2007

(86) PCT No.: PCT/IN2007/000302
§ 371 (c)(1),
(2), (4) Date: Sep. 30, 2009

(87) PCT Pub. No.: WO2008/035374
PCT Pub. Date: Mar. 27, 2008

(65) Prior Publication Data
US 2010/0111828 A1    May 6, 2010

(30) Foreign Application Priority Data
Jul. 21, 2006   (IN) .................. 1161/MUM/2006

(51) Int. Cl.
*C01B 33/36*    (2006.01)
*C01B 39/00*    (2006.01)
*C01B 39/02*    (2006.01)
*C01B 39/04*    (2006.01)
*C01B 15/16*    (2006.01)
*C01B 33/26*    (2006.01)
*C01F 7/00*    (2006.01)

(52) U.S. Cl. ........ 423/702; 423/700; 423/701; 423/704; 423/705; 423/706; 423/718; 423/305; 423/327.1

(58) Field of Classification Search .................. 423/305, 423/327.1, 700–718
See application file for complete search history.

(56) References Cited

U.S. PATENT DOCUMENTS
7,115,198 B2    10/2006    Zones et al.
7,498,011 B2    3/2009    Cao et al.

OTHER PUBLICATIONS

Morris, Russell E., et al., SSZ-51—A New Aluminophosphate Seotype: Synthesis, Crystal Structure, NMR, and Dehydration Properties, 2004, Chem. Mater., 16, pp. 2844-2851.*

Cao, Guang et al., Synthesis and sorptive properties of EMM-8: a new (silico)aluminophosphate, 2007, From Zeolites to Porous MOF Materials—the 40th Anniversary of Interantional Zeolite Conference, pp. 311-313.*

Park, Man, and Komarneni, Sridhar, "Rapid Synthesis of A1PO4-11 and Cloverite by . . . ", Microporous and Mesoporous Materials, 1998, pp. 39-44, vol. 20, Elsevier Science.

(Continued)

*Primary Examiner* — David M Brunsman
*Assistant Examiner* — Kevin Johnson
(74) *Attorney, Agent, or Firm* — IpHorgan Ltd.

(57) ABSTRACT

A novel microporous crystalline silicoalumino/(metallo)aluminophosphate molecular sieve framework (designated as BPC-1), having in its as-synthesized form, an X-ray diffraction pattern including the lines listed in Table 1, and method of its synthesis using 4-dimethylaminopyridine as organic templating agent in fluoride medium under microwave-hydrothermal conditions.

20 Claims, 3 Drawing Sheets

X-ray diffraction pattern for as-synthesized BPC-1

OTHER PUBLICATIONS

Szostak, R., Molecular Sieves: Principles of Synthesis and Identification, 2nd Edition, 1998, Blackie Academic and Professional, London.
Corma, et al, Angew. Chem. Int. Ed., ITQ-12, 2003, pp. 1156-1159, vol. 42.
Barret et al, Chem. Commun., SSZ-53, -59, 2003.
Burton et al, Chemistry: a Eur. Journal, 2003, pp. 5737-5748, vol. 9.
Berger et al, Microporous and Mesoporous Materials, 2005, pp. 333-344, vol. 83, 1-3.
Chezeau, J. M., et al, Zeolites, 1991, pp. 598, vol. 11.
Morris, et al., Chem. Mater., 2004, pp. 2844, vol. 16.
Komarneni, et al, Mater. Res. Bull., 1992, pp. 1393, vol. 27.
Ionics 1995, pp. 95, vol. 21.
Cundy, C. S., Coll. Czech. Chem. Commun., 1998, pp. 1699, vol. 63.
Oberender et al., Mat. Res. Symp. Proc., 1999, pp. 433, vol. 547.
Kang, et al., Catal. Lett., 1999, pp. 45, vol. 59.
Newalkar, et al, Chem. Commun., 2000, pp. 2389.
Chem. Mater., 2001, pp. 552, vol. 13.

* cited by examiner

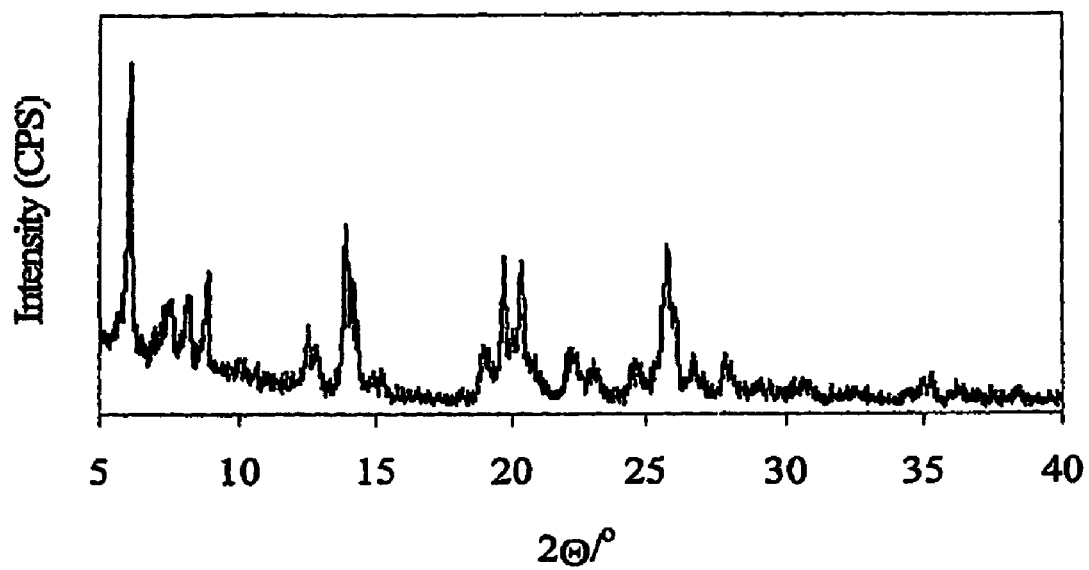
Fig. 1a: X-ray diffraction pattern for as-synthesized BPC-1

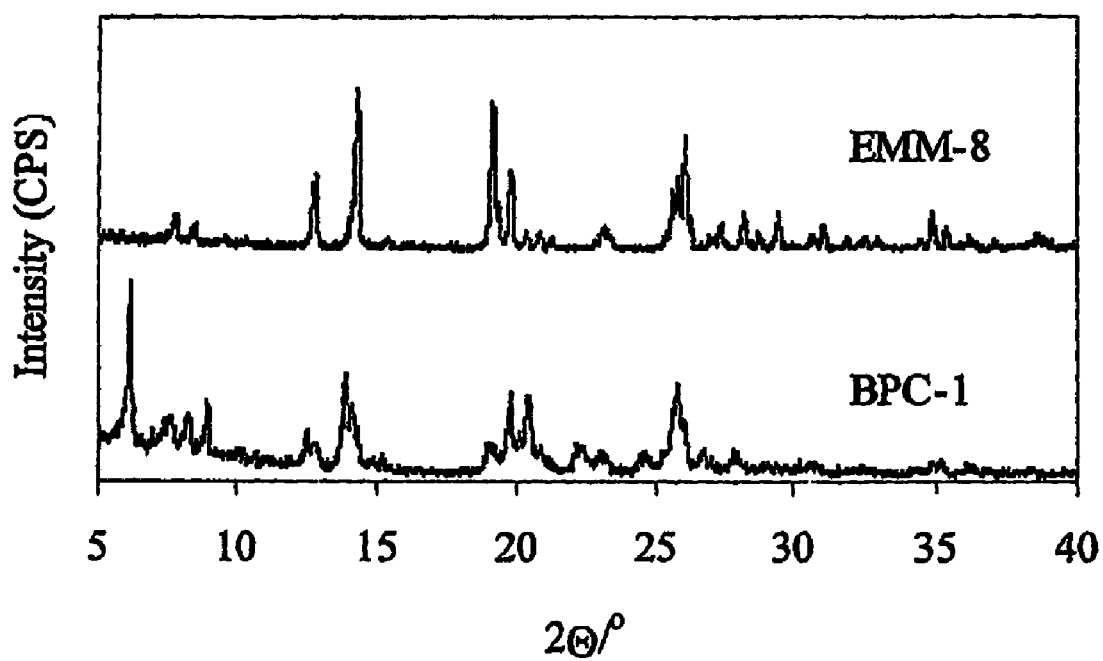
Fig. 1b: X-ray diffraction pattern for as-synthesized BPC-1 and its comparison with EMM-8

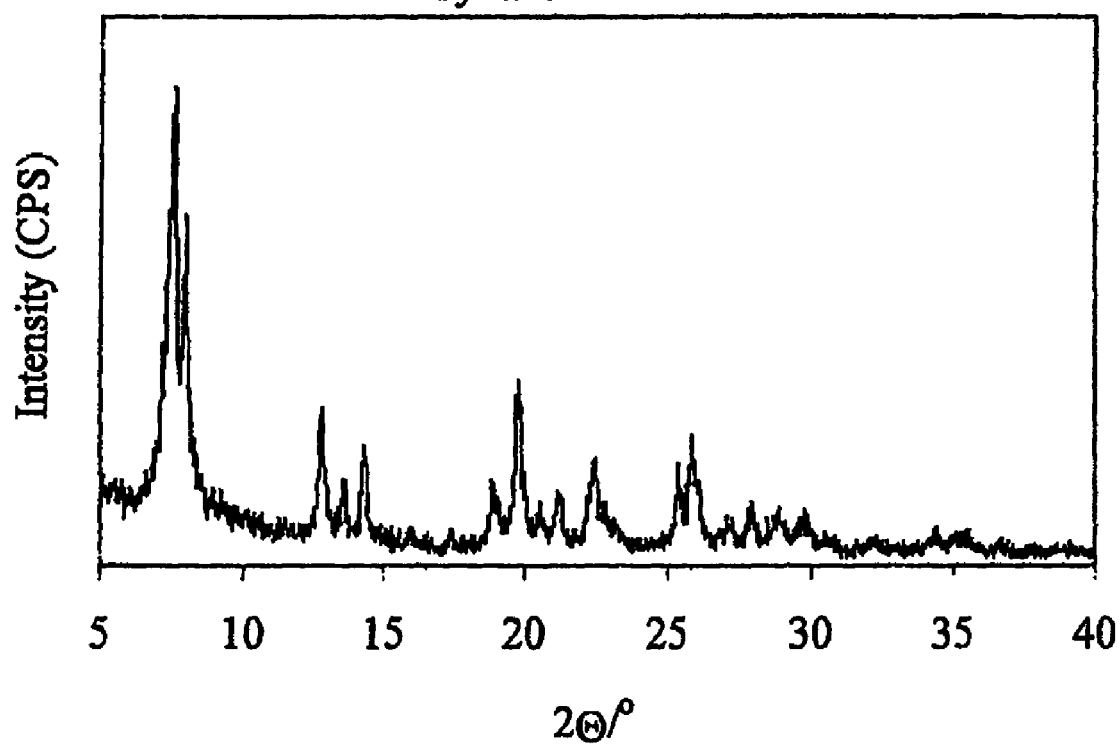
Fig. 2: X-ray diffraction pattern for calcined and hydrated BPC-1

MICROPOROUS CRYSTALLINE SILICOALUMINO/(METALLO) ALUMINOPHOSPHATE MOLECULAR SIEVE AND METHOD OF SYNTHESIS THEREOF

CROSS-REFERENCE TO RELATED APPLICATIONS

This is a National Phase of PCT Patent Application No. PCT/IN2007/000302, filed on Jul. 20, 2007, (published as WO 2008/0035374), which in turn relies for Paris Convention priority on Indian Patent Application No. 1161/MUM/2006, filed on Jul. 21, 2006, both applications being incorporated by reference as if fully set forth herein.

FIELD OF INVENTION

The present invention relates to a novel microporous crystalline silicoalumino/(metallo)aluminophosphate molecular sieve framework, or a substituted derivative thereof. The present invention also relates to the method of its synthesis in fluoride medium under microwave-hydrothermal conditions.

BACKGROUND AND PRIOR ART OF THE INVENTION

Crystalline molecular sieves have a 3-dimensional, microporous frameworks having tetrahedrally coordinated cation [$TO_4$]. Generally, frameworks comprising oxygen tetrahedra of aluminum and silicon cations leads to the formation of microporous aluminosilicate framework commonly known as zeolites. On the other hand, 3-dimensional microporous aluminophosphate (AlPOs) frameworks classified as zeo-type molecular sieves are composed of oxygen tetrahedra of Al and P cations whereas silicoaluminophosphate (SAPOs) type molecular sieves composed of oxygen tetrahedra of Si, Al and P cations.

Molecular sieves are typically described in terms of the size of pore window which is based on the number of T atoms present in the pore window. Typically they are classified as small, medium and large pore molecular sieves based on their pore opening. The small pore molecular sieves have pore size in between 0.4-0.5 nm. Medium pore molecular sieves have pore size in between 0.5-0.6 nm whereas large pore molecular sieves have pore opening of 0.6-0.8 nm (R. Szostak, *Molecular Sieves: Principles of synthesis and Identification, 2nd edition*, Blackie Academic and Professional, London, 1998).

Wide spread applications of crystalline molecular sieves in the field of petroleum processing, petrochemical, fine chemical has led to sustained research effort, both in industry and academia, for their discovery. This has resulted into synthesis of new frameworks such as ITQ-13 (Corma, et. al., *Angew. Chem. Int. Ed.* 42, 1156-1159 (2003)), ITQ-12 (Barrett et. al. *Chem. Commun.* (2003)), SSZ-53, -59 (Burton et. al. *Chemistry: a Eur. Journal* 9, 5737-5748 (2003), *Chemistry: a Eur. Journal* 9, 5737-5748 (2003)) in recent times.

Molecular sieves are usually synthesized under hydrothermal conditions from a reactive gel comprising of aluminum, silica and/or phosphorous sources in the presence of an organic structure directing agent, such as an organic nitrogen compound in the temperature range of 100-200° C. Commonly used nitrogen compounds are amines, diamines and quaternary ammonium salts.

Such syntheses are also carried out under solvothermal conditions employing non-aqueous solvents such as glycols. The use of mineralizing agents is also practiced in molecular sieve synthesis. For example, patent publication EP-A-337, 479 discloses the use of hydrogen fluoride in water at low pH to mineralize silica in glass for the synthesis of ZSM-5. The use of fluoride medium is also depicted in U.S. Pat. No. 6,793,901 for synthesis of aluminophosphate or silicoaluminophosphate molecular sieves having the CHA framework. The use of fluoride media is also reported to lead to the formation of large zeolite crystals (Berger et. al. *Microporous and Mesoporous Materials* 83, (1-3), 2005, 333-344).

Some of the zeolites cited above have been synthesized in a fluoride medium in which the mobilizing agent is not the usual hydroxide ion but a fluoride ion in accordance with a process initially in U.S. Pat. No. 4,073,865. One advantage of such fluorine-containing reaction systems is to allow the production of purely siliceous zeolites containing fewer defects than zeolites obtained in a traditional $OH^-$ medium (J M Chezeau et al, *Zeolites* 1991, 11, 598). A further decisive advantage of using fluorine-containing reaction media is to allow the production of novel framework topologies containing double cycles of four tetrahedra, as is the case with ITQ-7, ITQ-13, ITQ-12 and ITQ-17 zeolites.

Recently, the use of fluoride medium has led to crystallization of novel large pore aluminophosphate based molecular sieve of SFO type (Morris et al. *Chem. Mater.* 2004, 16, 2844).

More recently, the crystallization of EMM-8 phase (United States patent publication 2006/0074267) has been disclosed from fluoride free medium. Such framework has been claimed to be isostructural to SFO type framework on calcination.

The crystalline molecular sieve composition, BPC-1, disclosed in the present invention exhibits unique X-ray diffraction pattern with four peaks in the range of 2 theta 5-10° and differs with that of EMM-8. Thus its structural framework is primarily different than that of EMM-8.

Generally the crystallization of molecular sieves is performed under hydrothermal conditions in the temperature range of 100-200° C. which usually requires prolonged crystallization time for phase formation. This sometimes leads to the formation of thermodynamically stable dense phases such as tridymite, cristobalite, berlinite, quartz as impure phases. This is due to the metastable nature of zeolitic framework under crystallization conditions. Furthermore, conventional hydrothermal approach is often found to be energy intensive.

The microwave-assisted synthesis of molecular sieves is a relatively new area of research (Komarneni, et. al. *Mater. Res. Bull.* 1992, 27, 1393; *Ionics* 1995, 21, 95). It offers many distinct advantages over conventional synthesis. They include rapid heating to crystallization temperature due to volumetric heating, resulting in homogeneous nucleation, and fast supersaturation by the rapid dissolution of precipitated gels and eventually a shorter crystallization time compared to conventional autoclave heating. It is also energy efficient and economical.

This method has been successfully applied for the synthesis of several types of zeolites namely zeolite A, Y, ZSM-5, MCM-41, metal substituted aluminophosphate and gallophosphate. It has also been successfully applied for the synthesis of mesostructured thiogermanates/germanium sulfides. A rapid synthesis of titanium substituted MCM-41 molecular sieve has also been reported using microwave assisted approach. Recently, a rapid synthesis of SBA-15 and Ti-, and Zr-SBA-15 framework under microwave-hydrothermal conditions has been reported (Cundy, C. S. *Coll. Czech. Chem. Commun.* 1998, 63, 1699, Oberender et. al. *Mat. Res. Symp. Proc.* 1999, 547, 433. Kang, et. al. *Catal. Lett.* 1999, 59, 45. Newalkar, et. al. *Chem. Commun.* 2000, 2389, *Chem. Mater.* 2001, 13, 552).

The use of microwave-hydrothermal conditions in our research has led to the invention of novel microporous aluminophosphate framework (designated as BPC-1) in the presence of fluoride ions. The crystallized framework also appears to be isostructural to SFO type framework upon calcination.

OBJECTS OF THE INVENTION

It is therefore, an important object of the present invention to provide for a novel microporous aluminophosphate framework designated as BPC-1.

Another object of the present invention is to provide for a method of synthesis of crystalline BPC-1 in fluoride medium under microwave-hydrothermal conditions Yet, another object of the present invention is provide for the chemical composition of BPC-1 in terms of mole ratio of its constituents.

SUMMARY OF THE INVENTION

Accordingly, the present invention provides for a novel microporous crystalline aluminophosphates ("ALPO's), aluminosilicophosphates ("APSO's") metalloaluminophosphates ("MAPO's") and metalloaluminosilicophosphates ("MAPSO's") denominated BPC-1 and the methods for its preparation. BPC-1 has an essential framework structure whose chemical composition, expressed in terms of mole ratio:

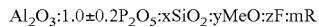

wherein
x=0 to 0.15;
y=0 to 0.2;
z=0 to 0.80;
m=0.3 to 5;
R represents at least one organic templating agent (structure directing agent); preferably R is 4-dimethylaminopyridine; and Me represents at least one element, other than aluminum, phosphorus or silicon, which is capable of forming an oxide in coordination with tetrahedra of $AlO_2$ and $PO_2$ oxide structural units in the molecular sieve (such as a divalent metal).

The microporous crystalline material of the invention is represented by the empirical formula on dry basis as $mR:aF^-$:$(M_xAl_yP_z)O_2$; wherein R represents at least one organic templating agent (structure directing agent); wherein the said organic templating agent is preferably 4-dimethylaminopyridine;
m=number of moles of R per mole of $(M_xAl_yP_z)O_2$, preferably m=0 to 2.0; a=number of moles of fluoride ion ($F^-$) per mole of $(M_xAl_yP_z)O_2$, preferably a=0.05 to 1.25; preferably m/a is less than or equal to 3.5;
M is a metal selected from one of the 3d Group elements as well as Group III A and/or IV A of the Periodic Table of Elements, preferably M is selected from the group consisting of B, Co, Cr, Cu, Fe, Ga, Ge, Mg, Mn, V, Ni, Sn, Ti, Zn and Zr, more preferably M is silicon; and
x, y, and z represent the mole fractions of M, Al and P as tetrahedral oxides, wherein in one embodiment x is from 0 to 0.20, y is from 0.3 to 0.5 and z is from 0.3 to 0.5.

The present invention also provides for the method of synthesis of microporous crystalline silicoalumino/(metallo) aluminophosphate molecular sieve framework (designated as BPC-1) comprising the steps of:
(a) forming a reaction mixture comprising water, reactive sources of aluminum and phosphorus, a source of fluoride ions, optionally a source of metal other than aluminum and phosphorous or a silica source, and at least one organic templating wherein the said organic templating agent is 4-dimethylaminopyridine;
(b) inducing crystallization of the said reaction mixture under hydrothermal conditions to obtain crystalline material; and
(c) recovering the said crystalline material from the reaction mixture.

In one embodiment of the method of synthesis of BPC-1 the source of $F^-$ ions is selected from metal fluoride salts, tetraalkylammonium fluoride salts and/or mixtures thereof; wherein the said metal fluoride salt is selected from the group comprising sodium fluoride, potassium fluoride, calcium fluoride, magnesium fluoride, strontium fluoride, barium fluoride and/or ammonium fluoride; and wherein the said tetraalkylammonium fluoride salt is selected from the group comprising tetramethylammonium fluoride, tetraethylammonium fluoride and/or hydrogen fluoride.

In another embodiment of the method of synthesis of BPC-1 the source of metal is selected from the group comprising B, Co, Cr, Cu, Fe, Ga, Ge, Mg, Mn, V, Ni, Sn, Ti, Zn and Zr.

In another embodiment of the method of synthesis of BPC-1 the reaction mixture is prepared in the molar ratio of $Al_2O_3$:$P_2O_5$:0.5HF:0.3-2R:10-100$H_2O$; wherein R is the organic templating agent 4-dimethylaminopyridine.

In another embodiment of the method of synthesis of BPC-1 the reaction mixture is prepared within the molar ratio range of $P_2O_5$:$Al_2O_3$=0.5 to 1.5 $SiO_2$:$Al_2O_3$=0 to 0.8 $H_2O$:$Al_2O_3$=10 to 100 R:$Al_2O_3$=0.5 to 5.0 F:$Al_2O_3$=0.1 to 0.8; where R is the organic templating agent 4-dimethylaminopyridine.

In another embodiment of the method of synthesis of BPC-1 the reaction mixture is prepared within the molar ratio range of $P_2O_5$:$Al_2O_3$=0.9 to 1.1 $SiO_2$/$MO_2$:$Al_2O_3$=0.01 to 0.3 $H_2O$:$Al_2O_3$=30 to 60 R:$Al_2O_3$=1.0 to 4.0 F:$Al_2O_3$=0 to 0.5; wherein R is the organic templating agent 4-dimethylaminopyridine and M is selected from the group consisting of B, Co, Cr, Cu, Fe, Ga, Ge, Mg, Mn, V, Ni, Sn, Ti, Zn and Zr.

In another embodiment of the method of synthesis of BPC-1 the crystallization of the said reaction mixture is induced under microwave-hydrothermal conditions.

In a preferred feature, the present invention provides a novel crystalline molecular sieve is synthesized using 4-dimethylaminopyridine, having in its as-synthesized form, an X-ray diffraction pattern including the lines listed in Table 1.

In another preferred feature the calcined form of a crystalline molecular sieve of the present invention has an X-ray diffraction pattern including the lines listed in Table 2.

In another preferred feature the calcined form of a crystalline molecular sieve of the present invention displays poor X-ray crystallinity in the range of 2 theta 5-40° upon dehydration above 400° C.

In another preferred feature the calcined form of a crystalline molecular sieve of the present invention regains its crystallinity upon hydration in the range of 2 theta 5-40° upon dehydration above 400° C.

In another preferred feature the calcined form of a crystalline molecular sieve of the present invention comprising [$AlO_4$] and [$PO_4$] corner sharing tetrahedral units and having an X-ray diffraction pattern including the lines listed in Table 1.

In another preferred feature the calcined form of a crystalline molecular sieve of the present invention also comprises [$SiO_4$] corner sharing tetrahedral units.

In a preferred feature the calcined form of crystalline molecular sieve of the present invention can be adopted for hydrocarbon processes based on adsorption and catalysis such as hydroisomerization, alkylation, oxidation reactions, especially epoxidation reactions and separation of hydrocarbons.

The as-synthesized hydrated BPC-1 exhibits an X-ray powder diffraction pattern which contains at least the d spacings in Table 1 set forth hereinafter and is different from those reported for EMM-8 framework (FIG. 1b).

After calcination and subsequent hydration, BPC-1 exhibits an X-ray powder diffraction pattern which contains at least the d-spacings in Table 2 set forth hereinafter.

After calcination and dehydration, BPC-1 exhibits poor X-ray powder diffraction pattern.

BRIEF DESCRIPTION OF THE DRAWINGS

FIG. 1a is an X-ray pattern (CuKα) of as-synthesized BPC-1.

FIG. 1b is an X-ray pattern (CuKα) of as-synthesized BPC-1 and its comparison with EMM-8.

FIG. 2 is an X-ray pattern (CuKα) of calcined and hydrated BPC-1.

DETAILED DESCRIPTION OF THE INVENTION

The novel microporous aluminophosphate, BPC-1, of the present invention can be produced by microwave-hydrothermal crystallization from a reaction mixture containing reactive sources of phosphorus and aluminum and an organic templating agent or structure directing agent (4-dimethylaminopyridine), a source of $F^-$ ions and, optionally additional divalent metals or sources of silica.

The preparative process typically comprises forming a reaction mixture which in terms of mole ratios is:

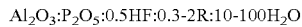

$Al_2O_3:P_2O_5:0.5HF:0.3-2R:10-100H_2O$ where R is the organic templating agent 4-dimethylaminopyridine. The reaction mixture is placed in a Teflon® (polytetrafluoroethylene) vessel inert toward the reaction mixture and heated under microwave-hydrothermal conditions (MARS-5, CEM Corp, USA) under static conditions at a temperature of at least about 100° C., preferably between 150° C. and 300° C., until crystallized, usually a period of from 5 to 120 minutes. The solid crystalline reaction product is then recovered by any convenient method, such as filtration or centrifugation, washed with water and dried in air at a temperature between ambient and about 100° C.

In a preferred crystallization method, the source of phosphorus is phosphoric acid, and the source of aluminum is a hydrated aluminum oxide of the trade name Catapal (Sasol), the temperature is 150° C. to 200° C., the crystallization time is from 15 to 60 minutes, and the ratio of compounds in the reaction mixture is

$Al_2O_3:1.0-1.2P_2O_5:0.5HF:1.0-2.0R:50-75H_2O$.

The templating agent is 4-dimethylaminopyridine and is present in the reaction mixture in an amount ranging from about 1.0 to 1.5 moles per mole of alumina. Additionally, sources of divalent metals such as magnesium, manganese, cobalt, zinc, nickel etc. can be added. In such instances these metals replace Al in the lattice so the amount of Al provided in the synthesis is reduced accordingly. Alternatively silica can also be introduced into the reaction. Typically, silicon replaces P in the lattice, so the amount of P provided in the synthesis is reduced accordingly.

The template-containing as-synthesized form of BPC-1 has an essential framework structure whose chemical composition expressed in terms of mole ratios is:

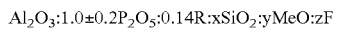

$Al_2O_3:1.0\pm 0.2P_2O_5:0.14R:xSiO_2:yMeO:zF$ where x, y, Me and z are as defined hereinbefore.

As-synthesized BPC-1 has a characteristic X-ray powder diffraction pattern (FIG. 1) which contains at least the d-spacings set forth in Table 1 below:

TABLE 1

| X-ray diffraction data for as-synthesized BPC-1 | |
|---|---|
| 2 theta | d (Å) |
| 6.17 | 14.31 |
| 7.67 | 11.51 |
| 8.25 | 10.70 |
| 8.94 | 9.87 |
| 12.57 | 7.03 |
| 12.81 | 6.90 |
| 13.95 | 6.34 |
| 14.14 | 6.25 |
| 14.34 | 6.17 |
| 15.25 | 5.80 |
| 16.16 | 5.47 |
| 18.12 | 4.89 |
| 18.98 | 4.66 |
| 19.72 | 4.49 |
| 20.41 | 4.35 |
| 20.85 | 4.26 |
| 22.24 | 3.99 |
| 23.02 | 3.86 |
| 24.57 | 3.61 |
| 25.81 | 3.44 |
| 26.07 | 3.41 |
| 26.73 | 3.33 |
| 27.86 | 3.19 |
| 28.22 | 3.16 |
| 29.46 | 3.03 |
| 30.77 | 2.90 |
| 32.44 | 2.75 |
| 34.35 | 2.61 |
| 35.28 | 2.54 |
| 36.15 | 2.48 |
| 38.35 | 2.34 |

The complete X-ray powder diffraction pattern, including actual relative intensities, for hydrous, as-synthesized BPC-1 is set forth in Table 1A below:

TABLE 1A

| X-ray diffraction data for as-synthesized BPC-1 | | | |
|---|---|---|---|
| 2 theta | d (Å) | Relative Intensity (%) | Remarks |
| 6.17 | 14.31 | 100.00 | VS |
| 7.67 | 11.51 | 14.27 | M |
| 8.25 | 10.70 | 23.16 | M |
| 8.94 | 9.87 | 29.82 | M |
| 12.57 | 7.03 | 21.37 | M |
| 12.81 | 6.90 | 13.17 | M |
| 13.95 | 6.34 | 53.50 | S |
| 14.14 | 6.25 | 40.08 | S |
| 14.34 | 6.17 | 20.37 | M |
| 15.25 | 5.80 | 4.78 | W |
| 16.16 | 5.47 | 0.46 | W |
| 18.12 | 4.89 | 2.54 | W |
| 18.98 | 4.66 | 18.91 | M |
| 19.72 | 4.49 | 37.11 | S |
| 20.41 | 4.35 | 50.88 | S |
| 20.85 | 4.26 | 13.74 | M |
| 22.24 | 3.99 | 15.77 | M |
| 23.02 | 3.86 | 14.79 | M |
| 24.57 | 3.61 | 11.10 | M |
| 25.81 | 3.44 | 53.45 | S |

TABLE 1A-continued

X-ray diffraction data for as-synthesized BPC-1

| 2 theta | d (Å) | Relative Intensity (%) | Remarks |
|---|---|---|---|
| 26.07 | 3.41 | 33.56 | S |
| 26.73 | 3.33 | 13.12 | M |
| 27.86 | 3.19 | 16.43 | M |
| 28.22 | 3.16 | 6.43 | W |
| 29.46 | 3.03 | 5.40 | W |
| 30.77 | 2.90 | 4.89 | W |
| 32.44 | 2.75 | 2.54 | W |
| 34.35 | 2.61 | 3.00 | W |
| 35.28 | 2.54 | 5.88 | W |
| 36.15 | 2.48 | 7.09 | W |
| 38.35 | 2.34 | 2.64 | W |

The relative intensity $I/I_o$ is given as a relative intensity scale to which the value of 100 is given to the most intense line on the X ray diffraction diagram $0.5 \leq W < 10$; $10 \leq M < 40$; $40 \leq S < 80$; $VS \geq 85$ wherein the notations VS, S, M, and W which represent Very Strong, Strong, Medium, and Weak, respectively.

When the as-synthesized BPC-1 compositions are calcined, i.e., heated at a temperature sufficiently high, typically between about 300° C. and about 700° C., to remove essentially all of the organic templating agent present in the intracrystalline pore system and then rehydrated, the composition has an X-ray powder diffraction pattern (FIG. 2) which contains at least the d-spacings set forth in Table II below:

TABLE 2

X-ray diffraction data for calcined and hydrated BPC-1

| 2 theta | d (Å) | Relative Intensity(%) | Remarks |
|---|---|---|---|
| 7.57 | 11.65 | 100 | VS |
| 7.97 | 11.08 | 70.80 | S |
| 12.72 | 6.95 | 23.63 | M |
| 13.59 | 6.51 | 14.61 | M |
| 14.31 | 6.18 | 21.93 | M |
| 15.99 | 5.54 | 2.37 | W |
| 17.37 | 5.10 | 3.45 | W |
| 18.86 | 4.70 | 15.50 | M |
| 19.79 | 4.48 | 40.34 | S |
| 20.49 | 4.33 | 8.04 | W |
| 21.25 | 4.18 | 12.57 | M |
| 22.44 | 3.95 | 20.18 | M |
| 25.45 | 3.49 | 19.82 | M |
| 25.91 | 3.44 | 22.18 | M |
| 27.25 | 3.27 | 5.45 | W |
| 27.93 | 3.19 | 8.47 | W |
| 29.01 | 3.07 | 6.42 | W |
| 29.81 | 2.99 | 5.83 | W |
| 30.87 | 2.89 | 2.06 | W |
| 31.66 | 2.82 | 1.42 | W |
| 32.10 | 2.78 | 3.29 | W |
| 34.40 | 2.60 | 5.60 | W |
| 35.53 | 2.52 | 3.70 | W |
| 36.65 | 2.45 | 1.45 | W |

The X-ray diffraction diagram is obtained by radiocrystallographic analysis using a diffractometer, using the conventional powder technique using the copper Kα1 line (λ=1.5406 Å). Starting from the position of the diffraction peaks represented by the angle 2θ, the Bragg relationship is used to calculate the characteristic interplanar spacings, $d_{hkl}$ of the sample. The error in measurement δ ($d_{hkl}$) over $d_{hkl}$ is calculated from the Bragg relationship as a function of the absolute error δ (2θ) in the measurement of 2θ. An absolute error δ (2θ) of ±0.2° is normally allowable. The relative intensity $I_{rel}$ for each value of $d_{hkl}$ is measured from the height of the corresponding diffraction peak. The X-ray diffraction diagram of the crystalline solid BPC-1 of the invention includes at least the lines with the $d_{hkl}$ values given in Table 1. The $d_{hkl}$ column shows the mean values for the interplanar spacings in angstroms (Å). Each of these values has a measurement error δ ($d_{hkl}$) in the range±0.2 to ±0.008 Å.

The room temperature powder X-ray diffraction pattern of BPC-1 changes dramatically after calcination to remove the occluded organic template and fluoride ions. It appears to closely resemble the X-ray diffraction pattern for the SFO type framework molecular sieve in calcined and hydrated form (United States patent publication 2005/0087478) and those reported for EMM-8 (United States patent publication 2006/0074267).

The calcined BPC-1 possesses appreciable microporosity, measured from nitrogen adsorption-desorption isotherm measurements at 77 K using AS-1C (Quantachrome, USA). The measured isotherm is typical of Type I in nature establishing the micropore nature for calcined form of BPC-1. The measured microporosity is found to be close to levels reported for FAU-type zeolites, thus indicating the likely presence of 12- and 8-rings.

The calcined form of hydrated BPC-1 is found to loose X-ray crystallinity upon dehydration and found to regain the same upon exposure to moist air.

BPC-1 in calcined form exhibits surface characteristics which make it useful as a catalyst or catalyst support in various hydrocarbon conversion and oxidation reaction in fine chemical production. Such can be associated with catalytically active metals, e.g., by framework substitution, by impregnation, doping and the like, by methods traditionally used in the art for the fabrication of catalyst compositions.

Further, BPC-1 in its calcined form can be used as a molecular sieve for the separation of molecular species.

The following examples are provided to illustrate the invention and are not to be construed as limiting thereof.

Example 1

Synthesis of BPC-1

BPC-1 is prepared by combining requisite amounts of hydrated aluminum oxide, (pseudo-boehmite), 85 wt % ortho-phosphoric acid ($H_3PO_4$), water, hydrofluoric acid and 4-dimethylaminopyridine (DMAP) to obtain a reactive gel composition of 1.5DMAP:$Al_2O_3$:$P_2O_5$:0.5HF:50$H_2O$ The resulting mixture is stirred until a homogeneous mixture is observed. The reaction mixture is sealed in a pressure vessel lined with polytetrafluoroethylene and heated at 180° C. under microwave-hydrothermal conditions at autogenous pressure for 5 mins. The solid reaction product is recovered by filtration, washed with water and dried in air at ambient temperature.

A portion of the solid reaction product is analyzed and the following chemical analysis obtained:

14.6 wt % Al, 15.5 wt % P and 1.4 wt % $F^-$

The organic content present in the crystallized solid is obtained by thermogravimetric analysis by following weight loss in the temperature range of 200-600° C. The organic content is found to be about 22 wt %.

The crystallized product is analyzed by X-ray powder diffraction for phase identification and found to be BPC-1 as per Table 1.

Example 2

The reactive gel is prepared as per procedure illustrated in Example 1. The reaction mixture is sealed in a pressure vessel lined with polytetrafluoroethylene and heated at 180° C. under microwave-hydrothermal conditions at autogenous pressure for 15 minutes. The solid reaction product is recovered by filtration, washed with water and dried in air at ambient temperature.

The crystallized product is analyzed by X-ray powder diffraction for phase identification and found to be BPC-1 as per Table 1.

Example 3

The reactive gel is prepared as per procedure illustrated in Example 1. The reaction mixture is sealed in a pressure vessel lined with polytetrafluoroethylene and heated at 180° C. under microwave-hydrothermal conditions at autogenous pressure for 30 minutes. The solid reaction product is recovered by filtration, washed with water and dried in air at ambient temperature.

The crystallized product is analyzed by X-ray powder diffraction for phase identification and found to be BPC-1 as per Table 1.

Example 4

The reactive gel is prepared as per procedure illustrated in Example 1. The reaction mixture is sealed in a pressure vessel lined with polytetrafluoroethylene and heated at 180° C. under microwave-hydrothermal conditions at autogenous pressure for 60 minutes. The solid reaction product is recovered by filtration, washed with water and dried in air at ambient temperature.

The crystallized product is analyzed by X-ray powder diffraction for phase identification and found to be BPC-1 as per Table 1.

Example 5

The reactive gel is prepared as per procedure illustrated in Example 1. The reaction mixture is sealed in a pressure vessel lined with polytetrafluoroethylene and heated at 180° C. under microwave-hydrothermal conditions at autogenous pressure for 120 minutes. The solid reaction product is recovered by filtration, washed with water and dried in air at ambient temperature.

The crystallized product is analyzed by X-ray powder diffraction for phase identification and found to be BPC-1 as per Table 1.

Example 6

The reactive gel is prepared as per procedure illustrated in Example 1 and required amount of Cabosil M-5 amorphous fumed silica is added in the prepared gel. The resultant mixture is once again mixed until homogeneous. The composition of reaction mixture in molar ratios is:

$$1.5DMAP:Al_2O_3:P_2O_5:0.5HF:0.1SiO_2:50H_2O$$

The reaction mixture is sealed in a pressure vessel lined with polytetrafluoroethylene and heated at 180° C. under microwave-hydrothermal conditions at autogenous pressure for 120 minutes. The solid reaction product is recovered by filtration, washed with water and dried in air at ambient temperature.

A portion of the solid reaction product is analyzed and the following chemical analysis obtained:

0.67 wt % Si, 14.6 wt % Al, 14.7 wt % P and 1.4 wt % F$^-$

The organic content present in the crystallized solid was obtained by thermogravimetric analysis by following weight loss in the temperature range of 200-600° C. The organic content is found to be about 22 wt %.

The crystallized product is analyzed by X-ray powder diffraction for phase identification and found to be BPC-1 as per Table 1.

Example 7

The reactive gel is prepared as per procedure illustrated in Example 1 and requisite amount of Cobalt nitrate amorphous fumed silica is added in the prepared gel. The resultant mixture is once again mixed until homogeneous. The composition of reaction mixture in molar ratios is:

$$1.75DMAP:Al_2O_3:P_2O_5:0.5HF:0.1Co_2O_3:50H_2O$$

The reaction mixture is sealed in a pressure vessel lined with polytetrafluoroethylene and heated at 180° C. under microwave-hydrothermal conditions at autogenous pressure for 120 minutes. The solid reaction product is recovered by filtration, washed with water and dried in air at ambient temperature.

A portion of the solid reaction product is analyzed and the following chemical analysis obtained:

1.8 wt % Co, 11.1 wt % Al, 12.7 wt % P and 1.4 wt % F$^-$

The crystallized product is analyzed by X-ray powder diffraction for phase identification and found to be BPC-1 as per Table 1.

Example 8

Calcination of BPC-1

The material obtained from Example 1 is calcined in air in the following manner. A thin bed of material is heated in a tubular quartz reactor from room temperature to 120° C. at a rate of 1° C. per minute and held at 120° C. for two hours. The temperature is then ramped up to 540° C. at the same rate and held at this temperature for 10 hours.

Example 9

X-Ray Diffraction Analysis

X-ray diffraction pattern for material from Example 7 is measured in the 2theta range of 5-40° C. with CuKα radiation with a 0.02° step size and 1s step time. The X-ray diffraction pattern was measured using a Philips X'pert powder diffractometer system. The measured X-ray diffraction pattern is found to be as per Table 2.

Example 10

Nitrogen Adsorption Analysis

The calcined form of BPC-1 has a micropore volume (t-plot) of about 0.28 cc/g with surface area of about 800 m$^2$/g based on adsorption isotherm at 77 K recorded on AS-1C unit from Quantachrome. The nitrogen adsorption isotherm is analyzed using the non linear density function theory (NLDFT) approach (*J. Phys. Chem. B.*; 2001 105(29); 6817) and the conventional t-plot method (*J. Catalysis*, 1965, 4, 319). The DFT analysis also shows that calcined form of BPC-1 has at least one large pore.

We claim:

1. A microporous crystalline silicoalumino/(metallo) aluminophosphate molecular sieve framework, designated as BPC-1, prepared by crystallization under microwave-hydrothermal conditions having a chemical composition expressed in terms of molar ratio:

$$Al_2O_3:1.0\pm0.2P_2O_5:XSiO_2:yMeO:zF:mR$$

wherein
x=0 to 0.15;
y=0 to 0.2;
z=0.05 to 0.80;
m=0.3 to 5;
R represents at least one organic aromatic templating agent; and
Me represents at least one element, other than aluminum, phosphorus or silicon, which is capable of forming an oxide in coordination with tetrahedra of $AlO_2$ and $PO_2$ oxide structural units in the molecular sieve.

2. The microporous crystalline material as claimed in claim 1 wherein the crystalline material is represented by the empirical formula, on dry basis:

$$mR:aF:(M_xAl_yP_z)O_2$$

wherein
R represents at least one organic aromatic templating agent;
m=number of moles of R per mole of $(M_xAl_yPz)O_2$ in a range of from 0.3 to 2.0;
a=number of moles of fluoride ion ($F^-$) per mole of $(M_xAl_yP_z)O_2$ in a range of from 0.05 to 1.25;
M is a metal selected from one of the 3d Group elements as well as Group III A and/or IV A of the Periodic Table of Elements; and
x, y, and z represent the more fractions of M, Al and P as tetrahedral oxides wherein
x=0 to 0.2;
y=0.3 to 5; and
z=0.3 to 5.

3. The microporous crystalline material as claimed in claim 2 wherein m/a is in a range of from 0.1 to 3.5.

4. The microporous crystalline material as claimed in claim 3 wherein M is selected from the group consisting of B, Co, Cr, Cu, Fe, Ga, Ge, Mg, Mn, V, Ni, Sn, Ti, Zn and Zr.

5. The microporous crystalline material as claimed in claim 3 wherein M is silicon.

6. The microporous crystalline material as claimed in claim 2 wherein M is selected from the group consisting of B, Co, Cr, Cu, Fe, Ga, Ge, Mg, Mn, V, Ni, Sn, Ti, Zn and Zr.

7. The microporous crystalline material as claimed in claim 2 wherein M is silicon.

8. The microporous crystalline material as claimed in claim 2 wherein the said organic aromatic templating agent is 4-dimethylaminopyridine.

9. A method of synthesis of microporous crystalline silicoalumino/(metallo) aluminophosphate molecular sieve framework, designated as BPC-1, of chemical composition expressed in terms of molar ratio:

$$Al_2O_3:1.0\pm0.2P_2O_5:xSiO_2:yMeO:zF:mR$$

wherein
x=0 to 0.15;
y=0 to 0.2;
z=0.05 to 0.80;
m=0.3 to 5.0;
R represents at least one organic aromatic templating agent; and Me represents at least one element, other than aluminum, phosphorus or silicon, which is capable of forming an oxide in coordination with tetrahedra of $AlO_2$ and $PO_2$ oxide structural units in the molecular sieve comprising the steps of:
(a) preparing a reaction mixture comprising water, reactive sources of aluminum and phosphorus, a source of fluoride ions, optionally a source of metal other than aluminum and phosphorous or a silica source, and at least one organic aromatic templating in the molar ratio of $$Al_2O_3:P_2O_5:0.5HF:0.12\text{-}3.0R:10\text{-}100H_2O$$

wherein R represents at least one organic aromatic templating agent;
(b) inducing crystallization of the said reaction mixture under microwave hydrothermal conditions to obtain crystalline material; and
(c) recovering the said crystalline material from the reaction mixture.

10. The method as claimed in claim 9 wherein the said source of fluoride ions is selected from the group consisting of metal fluoride salts, tetraalkylammonium fluoride salts, hydrogen fluoride, ammonium fluoride and/or mixtures thereof.

11. The method as claimed in claim 10 wherein the said metal fluoride salt is selected from the group consisting of sodium fluoride, potassium fluoride, calcium fluoride, magnesium fluoride, strontium fluoride and barium fluoride.

12. The method as claimed in claim 10 wherein said tetraalkylammonium fluoride salt is selected from the group consisting of tetramethylammonium fluoride and tetraethylammonium fluoride.

13. The method as claimed in claim 10 wherein said source of metal is selected from the group consisting of B, Co, Cr, Cu, Fe, Ga, Ge, Mg, Mn, V, Ni, Sn, Ti, Zn and Zr.

14. The method as claimed in claim 10 wherein said reaction mixture is prepared within the molar ratio range of $P_2O_5$:$Al_2O_3$=0.8 to 1.2; $SiO_2$:$Al_2O_3$=0 to 0.15; $H_2O$:$Al_2O_3$=10 to 100 R; $Al_2O_3$=0.3 to 5.0 F; $Al_2O_3$=0.05 to 0.8;
wherein R is the organic aromatic templating agent.

15. The method as claimed in claim 10 wherein the said organic aromatic templating agent is 4-dimethylaminopyridine.

16. The method as claimed in claim 10 wherein the said reaction mixture is prepared within the molar ratio range of $P_2O_5$:$Al_2O_3$=0.9 to 1.1; $SiO_2$/$MO_2$:$Al_2O_3$=0.01 to 0.15; $H_2O$:$Al_2O_3$=30 to 60; R:$Al_2O_3$=1.0 to 4.0; F:$Al_2O_3$=0.05 to 0.5;
wherein R is the aromatic organic templating agent 4-dimethylaminopyridine and
M is selected from the group consisting of B, Co, Cr, Cu, Fe, Ga, Ge, Mg, Mn, V, Ni, Sn, Ti, Zn and Zr.

17. The method as claimed in claim 9 wherein said source of metal is selected from the group consisting of B, Co, Cr, Cu, Fe, Ga, Ge, Mg, Mn, V, Ni, Sn, Ti, Zn and Zr.

18. The method as claimed in claim 9 wherein said reaction mixture is prepared within the molar ratio range of $P_2O_5$: $Al_2O_3$=0.8 to 1.2; $SiO_2$:$Al_2O_3$=0 to 0.15; $H_2O$:$Al_2O_3$=10 to 100; R:$Al_2O_3$=0.3 to 5.0; F:$Al_2O_3$=0.05 to 0.8;
wherein R is the organic aromatic templating agent.

19. The method as claimed in claim 9 wherein the said organic aromatic templating agent is 4-dimethylaminopyridine.

20. The method as claimed in claim 9 wherein the said reaction mixture is prepared within the molar ratio range of $P_2O_5:Al_2O_3$=0.9 to 1.1; $SiO_2/MO_2:Al_2O_3$=0.01 to 0.15; $H_2O:Al_2O_3$=30 to 60; $R:Al_2O_3$=1.0 to 4.0; $F:Al_2O_3$=0.05 to 0.5;

wherein R is the aromatic organic templating agent 4-dimethylaminopyridine and

M is selected from the group consisting of B, Co, Cr, Cu, Fe, Ga, Ge, Mg, Mn, V, Ni, Sn, Ti, Zn and Zr.

* * * * *